Dec. 25, 1962   L. F. KOOISTRA   3,070,534
FUEL ELEMENTS
Filed Oct. 30, 1958
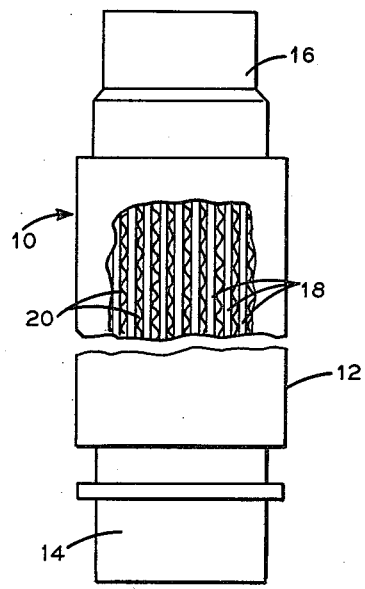
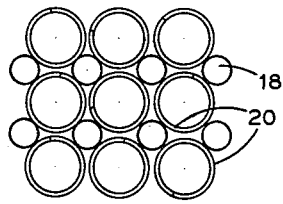
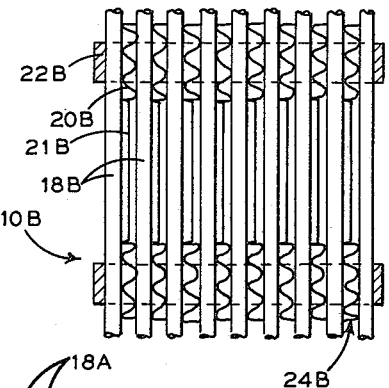
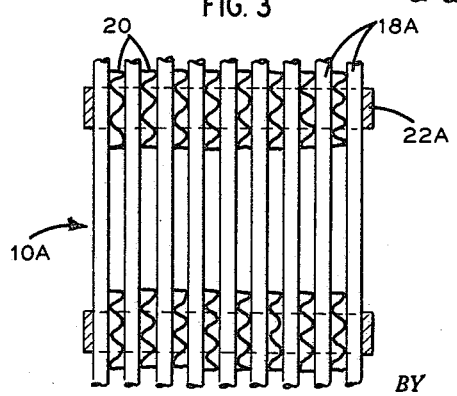
*INVENTOR.*
Lambert F. Kooistra
BY
ATTORNEY 3,070,534
FUEL ELEMENTS
Lambert F. Kooistra, Akron, Ohio, assignor to The Babcock & Wilcox Company, New York, N.Y., a corporation of New Jersey
Filed Oct. 30, 1958, Ser. No. 770,691
7 Claims. (Cl. 204—193.2)

This invention relates in general to fuel elements for use in nuclear reactors, and more particularly to spacers for separating fuel-containing components within a fuel element.

In heterogeneous reactors a fissionable material and a moderator are arranged as discrete bodies, usually in a regular pattern, to form a core within which a nuclear chain reaction can be produced. The fissionable material, or fuel as it is usually called, is arranged within the core in fuel elements. Each fuel element is made up, generally, of a group of uniformly shaped fuel-containing components. It is within these components that the heat from a nuclear chain reaction is generated. A coolant, flowing over the components, removes heat generated in the chain reaction so that it may be transferred for conversion into a usable form.

The present invention is concerned with the problem of spacing the fuel-containing components within a fuel element. In many cases the components are closely spaced, having a small transverse cross-section in comparison to their length. In order to maintain an adequate flow of coolant about each component and thus avoid the development of hot spots, that is areas which develop excessive temperatures due to inadequate heat transfer, which could result in component failure, optimal spacing arrangements must be provided. These spacers must be capable of providing adequate spacing with low resistance to coolant flow. Moreover the spacers must have the requisite structural strength to hold the fuel-containing components in position while at the same time allowing sufficient flexibility to permit movement due to cyclic differences in operating temperatures of the individual adjacent components.

Additionally, the cross-sectional area of the spacer presented to the flow of the coolant must be such that it does not cause a disproportionately large fluid pressure drop, since this may result in insufficient cooling of the fuel-containing components. Further, the spacers also should preferably provide an economical construction whereby a bundle of fuel-containing elements can be readily assembled.

Accordingly, the present invention provides a spacer for use in a fuel element which is disposed between and in parallel relationship with the fuel-containing components within the fuel element to maintain them in a regular geometric pattern.

Additionally, the spacing means may extend for the full length of the components, or they may be of relatively short length and be placed at intervals along the length of the components.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred form of our invention.

In the drawings:

FIG. 1 is an elevation, partly in section, of a fuel element, embodying the construction of the present invention, FIG. 2 is an enlarged partial transverse cross-section of the fuel-containing components and spacers within the fuel element shown in FIG. 1, and FIG. 3 is a partial longitudinal cross-section of a fuel element showing an alternate embodiment of the present invention, and FIG. 4 is a partial longitudinal cross-section of a fuel element showing another alternate embodiment of the present invention.

A typical example of a reactor system in which the fuel element spacer of the present invention could be used is to be found in the co-pending application of the common assignee, Serial No. 712,512 of Melvin F. Sankovich, filed January 31, 1958, refiled October 9, 1961 as Serial No. 145,012. This co-pending application reveals a fuel element generally similar in size and shape to the one illustrated in FIG. 1. As is illustrated in the co-pending application, the fuel element is positioned within the reactor, between an upper and a lower grid plate. The fuel element is equipped with end adapters which fit within grid plates and hold the fuel elements in position within the reactor core. Further the co-pending application contains a table disclosing the sizes of the fuel-containing components, or fuel pins, contained within the fuel element. Certain dimensions and features of the fuel elements disclosed therein are given here to illustrate a typical fuel element within which the spacing arrangement of the present invention could be used:

Total fuel pin length_____ 99 in.
Fuel pin outside diameter_____ 0.3125 in. nominal.
Fuel pin spacing (square lattice)_____ 0.3805 in. nominal.
Total fuel pins per fuel element_____ 206.

In FIG. 1 there is shown a longitudinally elongated fuel element 10 having exterior walls formed by an open ended can 12 of rectangular cross-section. This can 12 provides a passageway for the flow therethrough of a coolant fluid. The fuel element has an inlet adapter 14 disposed in one end of the can 12 and an outlet adapter 16 arranged in the opposite end of the can. These adapters 14, 16 are designed to fit within the upper and lower grid plates (not shown) of a reactor as illustrated in the co-pending application previously discussed. A plurality of elongated cylindrical fuel pins 18 are situated wholly within the fuel element can 12 in parallel relationship with the longitudinal axis of the fuel element 10. The fuel pins 18 are arranged in a square lattice and have a very great length to diameter ratio.

The spacing and lateral support of the fuel pins 18 within the fuel element 10 is maintained by a number of helical cylindrical springs 20, see FIG. 2. The springs 20 are of substantially the same length as the fuel pins 18 and the coils have a relatively long pitch. Each spring 18 is accurately wound with a plus tolerance so that it will fit tightly in the center of a group of four fuel pins 18 which form the corners of a square.

The fuel element 10 is arranged to receive and pass therethrough a coolant fluid. The coolant fluid enters the fuel element 10 through the inlet adapter 14 flows through the passageway formed by the fuel element can 12 and then leaves the fuel element through the outlet adapter 16. As the coolant fluid courses through the passageway it flows about the fuel pins 18 removing the heat generated in the nuclear chain reaction. The conformation of the helical spring 20 is such that it promotes turbulence within the coolant fluid and results in improved heat transfer from the fuel pins 18 to the coolant fluid.

The bundle of fuel pins 18 and springs 20 which form the internals of the fuel element 10 can be constructed in the following manner. The fuel pins 18 are arranged in spaced rows in a suitable assembly jig. The springs 20 are stretched within their elastic limit to reduce the outside diameter prior to their being placed between the fuel pins 18. When the entire bundle is assembled the springs 20 are released and they return to substantially their normal diameter thus providing a firm, resilient support for the spaced fuel pins 18. This is a preferred method of fuel pin bundle assembly. However, it should be understood that it may be assembled by other methods well known in the art.

In FIG. 3 there is shown an alternate embodiment of the spacing arrangement of the present invention. The same reference numerals are used in FIG. 3 as in FIGS. 1 and 2 with the addition of the suffix A.

There is shown in FIG. 3 a portion of fuel element 10A comprising a plurality of longitudinally elongated fuel pins 18A arranged in a square lattice. The fuel pins 18A have a very great length to diameter ratio. The spacing and lateral support of the fuel pins 18A is maintained by a number of helical cylindrical springs 20A having a relatively long pitch. As compared to the full length springs of FIGS. 1 and 2, the springs 20A are of relatively short length and are spaced at intervals in common transverse planes along the length of the fuel pins 18A.

Bands 22A encircle the fuel pins 18A at the locations of each transverse plane of springs 20A. The bands 22A in combination with the springs 20A provide a firm, resilient support for the bundle of fuel pins 18A.

Unlike the fuel element 10 illustrated in FIGS. 1 and 2 the fuel element 10A of FIG. 3 does not have an enclosing can 12. For use in a reactor of the type disclosed in the previously mentioned co-pending application the fuel element 10A would have end adapters (not shown) which would hold the fuel element in position within and between the upper and lower grid plates, and the coolant fluid would be free to circulate about all of the fuel elements 10A. As with the full length springs 20 the short springs 20A will promote turbulence in the coolant fluid which will result in improved heat transfer between the fuel pins 18A and the coolant fluid.

In addition to the spacer arrangement involving the use of short length springs 20A shown in FIG. 3, it is also possible to serially connect a number of these short length springs by interposing straight sections between the spring sections. This arrangement, as shown in FIG. 4, is similar to that illustrated in FIG. 3 and uses the same reference numerals but with a different suffix.

A fuel element 10B is shown in FIG. 4 comprising a plurality of longitudinally elongated fuel pins 18B. The fuel pins 18B are spaced and laterally supported by serially connected spring assemblies 24B. The spring assembly is made up of a number of short length springs 20B connected by straight sections 21B which parallel the fuel pins 18B. The spring assemblies 24B are arranged so that the short length springs 20B are located in common transverse planes. A band 22B encircles the fuel pins 18B at the location of each transverse plane of springs 20B to provide in combination with the springs a firm, resilient support for the fuel pins. This type of serially connected spring spacer could be assembled in the fuel pin bundle in the same manner as described for the full length spring spacer of FIG. 1.

Further, these short length springs could also be serially connected to form a parallel transverse spring spacer arrangement. In this case the springs are connected by straight sections normal to the longitudinal axis of the springs. This arrangement provides a spacer assembly which affords control of both longitudinal and transverse fuel pin spacings.

The preferred embodiments of this invention have been illustrated using helical cylindrical springs having a relatively long pitch. It will be understood by those skilled in the art that other spring configurations may be used such as helical conical or flat spiral construction and they are not limited to spring constructions of circular transverse sections. Further, springs having a short pitch may be used as well as those that have a long pitch.

In the drawings the fuel pins are disposed in a square lattice, however, the spacing arrangement of the present invention will work equally well in any other symmetrical arrangement of fuel pins. In addition, it is not necessary that there be uniform spacing. It is possible to vary the sizes of the springs to increase the flow area about certain of the fuel-containing components.

It should be understood that the spring spacers of the present invention can be used in any fuel element or bundle of fuel pins. It is not restricted to those completely contained within a fuel element can or strapped together by means of bands.

The fuel elements have been illustrated and described with the springs and fuel-containing components held in position by means of mechanical contact. It is also proposed that the springs and fuel-containing components could, when desired, be joined at their point of contact by brazing or similar operation to provide an integral connection.

Therefore, the present invention provides a new and useful spacing means for the fuel-containing components of a nuclear reactor fuel element. The spacer springs illustrated and described herein provide flexible, resilient support for the fuel-containing components, and particularly those which are closely spaced, without causing excessive pressure drop through the fuel element or interfering with the heat transfer relationship between the fuel-containing elements and the coolant fluid.

The spring spacers when arranged within a bundle of fuel-containing components present a small cross-section to the flow of coolant fluid in any single transverse plane. In this manner there is not any substantial pressure drop caused due to the position or configuration of the spring within the fuel element.

Further, since the spacing of the fuel-containing components is attained by means of point contact with the spacer springs, there will be little likelihood for hot spots to develop as a result of inadequate heat transfer from component to coolant fluid. In addition, the configuration of the springs in fuel-containing component assembly will promote turbulence within the coolant fluid, with consequent improvement in the heat transfer rate.

As has been discussed the positioning of the spring spacers within the flow channels associated with the fuel elements promotes turbulence within the coolant fluid flowing therein. This turbulence or interruption of the flow reduces the possibility of the formation of a vapor film on the interface surfaces of the fuel-containing components. By avoiding the formation of a vapor film the possibility is greatly reduced of the occurrence of the boiling phenomenon wherein nucleate boiling changes over to film boiling. Where film boiling occurs there is the strong possibility of failure of the fuel-containing components due to overheating. Therefore, the net result of this action is to permit higher heat flux rates within the core of a nuclear reactor without incurring the injurious effect of film boiling on the fuel-containing components. This characteristic is particularly significant in the case of boiling water reactors.

The fuel-containing components of a fuel element require a certain flexibility of movement to allow for normal cyclic differences in operating temperature. The spring spacer of the present invention provides this flexibility by its very nature and even when brazed or otherwise bonded to the fuel-containing components will still retain its resilient character between points of contact.

Finally the present invention is directed to a spacer for fuel-containing components which is readily adaptable to variations in the spacing and size of fuel-containing components, and is economical to manufacture and easy to install.

While in accordance with the provisions of the statutes, I have illustrated and described herein a specific form of the invention now known to me, those skilled in the art will understand that changes may be made in the

What is claimed is:

1. A fuel element for use in a nuclear reactor comprising a plurality of longitudinally elongated fuel-containing components, and helical spring means arranged in parallel relationship with said components, said spring means having spaced convolutions disposed between and contacting a plurality of said components to space the components in a symmetrical array.

2. A fuel element for use in a nuclear reactor comprising an elongated container, a plurality of longitudinally elongated fuel-containing components positioned within said container, and helical spring means of relatively short length compared with said components arranged in parallel relationship therewith and positioned at longitudinal intervals along said components, said spring means having spaced convolutions disposed between and contacting a plurality of said components to space them in a symmetrical array.

3. A fuel element for use in a nuclear reactor comprising an elongated container, a plurality of longitudinally elongated fuel-containing components positioned within said container, and helical spring means of substantially the same length as said components and arranged in parallel relationship therewith, said spring means having spaced convolutions disposed between and contacting a plurality of said components to space them in a symmetrical array.

4. A fuel element for use in a nuclear reactor comprising an elongated container, a plurality of longitudinally elongated fuel-containing components positioned within said container, helical spring means of relatively short length compared with said components arranged in parallel relationship therewith, and straight sections linking said short length helical spring means together, said spring means having spaced convolutions disposed between and contacting a plurality of said components to space them in a symmetrical array.

5. A fuel element for use in a nuclear reactor comprising a plurality of longitudinally elongated fuel-containing components, helical spring means arranged in parallel relationship with said components, said spring means having spaced convolutions disposed between and contacting a plurality of said components to space them in a regular geometric pattern and a strap arranged about said bundle to maintain said components in position.

6. A fuel element for use in a nuclear reactor comprising a plurality of longitudinally elongated fuel pins, containing means disposed about the periphery of said fuel pins, helical cylindrical springs arranged in parallel relationship with said components, said spring means having spaced convolutions disposed between and contacting a plurality of said components to space them in a symmetrical array, and straight sections linking said springs together.

7. A fuel element for use in a nuclear reactor comprising an elongated container having imperforate walls and open ends, an inlet adapter in one of said open ends, an outlet adapter in the other of said open ends, a bundle of longitudinally elongated fuel pins arranged in a square lattice within said container, and a plurality of cylindrical helical springs having a relatively long pitch and being of substantially the same length as said fuel pins and arranged in parallel relationship with said fuel pins, said springs disposed between and in point contact with said fuel pins, each of the springs contacting and spacing a set of four fuel pins.

References Cited in the file of this patent

UNITED STATES PATENTS

| 2,505,695 | Villiger et al. | Apr. 25, 1950 |
| 2,735,658 | Cook | Feb. 21, 1956 |

FOREIGN PATENTS

| 553,485 | Great Britain | May 24, 1943 |
| 768,078 | Great Britain | Feb. 13, 1957 |

OTHER REFERENCES

TID–7529 (Pt. 1), Heat Transfer Conf. 1956, pp. 251–257.

GER–1301, Progress Report on Dresden Station, presented at a joint session of the Nuclear Engineering and Power Divisions at the ASME Annual Meeting, N.Y.C., Nov. 26, 1956, in particular pages 12–13. Available from Distribution Section, General Electric Co., Schenectady, New York or other G.E. Apparatus Sales Offices.